United States Patent [19]

Schneider et al.

[11] Patent Number: 5,493,743
[45] Date of Patent: Feb. 27, 1996

[54] OZONE ASSISTED LAUNDRY WASH PROCESS AND WASTE WATER TREATMENT SYSTEM

[75] Inventors: Keith R. Schneider, Alachua, Fla.; Joe T. Lee, Jr., Indian Wells, Calif.; Richard S. Dingler, Fort Pierce; Charles W. Pearsall, Palm City, both of Fla.

[73] Assignee: Tri-O-Clean Laundry, Inc., Ft. Pierce, Fla.

[21] Appl. No.: 279,019

[22] Filed: Jul. 22, 1994

[51] Int. Cl.⁶ .................................................. D06F 39/02
[52] U.S. Cl. ........................... 8/149.2; 8/159; 68/17 R; 68/207; 68/183
[58] Field of Search .................. 8/158, 159, 149.1, 8/149.2; 68/17 R, 207, 183

[56] References Cited

U.S. PATENT DOCUMENTS

| | | |
|---|---|---|
| 1,362,658 | 12/1920 | Willford . |
| 3,065,620 | 11/1962 | Houser . |
| 3,130,570 | 4/1964 | Rentzepis ............................ 68/207 X |
| 3,805,481 | 4/1974 | Armstrong . |
| 4,141,686 | 2/1979 | Lewis . |
| 4,204,955 | 5/1980 | Armstrong . |
| 4,409,188 | 10/1983 | Silberzahn . |
| 4,517,159 | 5/1985 | Karlson . |
| 5,097,556 | 3/1992 | Engel et al. . |
| 5,154,895 | 10/1992 | Moon . |

*Primary Examiner*—Frankie L. Stinson
*Attorney, Agent, or Firm*—Aquilino & Welsh

[57] ABSTRACT

A method and apparatus of washing laundry using a reduce amount of, or without the use of, hot water and detergents using a closed-loop or open-loop ozonated wash water system wherein wash water maintained in a contact tank is ozonated by an ozone generator prior to use in the washing machine. The oxygen and/or dried air used in the ozone generator to generate the ozone is concentrated by an oxygen concentrator before being fed into the generator. The system includes a venturi injector for entraining ozone into the water in the storage and contact tanks. The system also includes the use of contact extenders, static mixers and flow restriction fittings. The spent wash water may be collected, filtered and reused, thereby eliminating waste water disposal problems, resulting in considerable water and energy savings.

9 Claims, 3 Drawing Sheets

OZONE ASSISTED LAUNDRY WASH PROCESS AND WASTE WATER TREATMENT SYSTEM

BACKGROUND AND SUMMARY OF THE INVENTION

The present invention relates to a laundry waste water treatment and wash process, and in particular, to such a process using ozone as a cleaning and disinfecting agent. The invention is an improvement over U.S. Pat. Nos. 5,097,556; 5,181,399 and 5,241,720 which are assigned to the assignee of the present invention. The disclosure and technologies discussed in U.S. Pat. Nos. 5,097,556; 5,181,399 and 5,241,720 are incorporated herein by way of reference.

Ozone, a gas at room temperature formed by a combination of free individual oxygen molecules, is a powerful oxidizing agent, and as such, has proven effective in the removal of odor, soil and other contamination materials from textiles. In the prior patent, a process for washing laundry using a closed-loop wash water system was disclosed in which a wash water supply is ozonated and delivered to a series of washing machines for washing laundry. The used wash water is collected at the end of the cycle and recirculated back to the storage means for re-use. The waste materials, such as soil, lint and so forth, are removed from the wash water at the end of the wash cycle prior to it being recycled back to the supply. Filtering, recirculating and replenishing wash water lost during the washing process are among the process steps disclosed in the patent.

Whereas the prior patented processes operated with some success, the machinery was too large for most commercial applications and was labor and maintenance intensive for the purpose of washing clothes, the present invention relates to an improved process for accomplishing an improved result, and in particular, to an improved efficiency in the method of generating ozone, an improved method of entraining the ozone with the wash water, and improved methods of waste removal, resulting in a more compact system design, increased automation and lower maintenance requirements. Ozone generation is greatly enhanced by the addition of an oxygen and/or dried air feed concentrator. The increased output of an oxygen allows for greater ozone production, while reducing the overall footprint associated with ozone generation equipment, thus allowing for operation in a greater number of locations with space restrictions. Furthermore, the increased output allows for dissolution of greater amounts of ozone in the water and at significantly faster rates, which allows the dissolved ozone levels to be maintained. This reduces start-up times, increases the disinfection rate, increases deodorization rates, and increases the oxidation rates of other water-borne contaminates. This will allow for smaller water storage and water contact tank sizes, which will reduce the overall footprint associated with such water containment vessels, thus allowing for installation and operation in areas with severe space limitations. Furthermore, ozone entrainment is enhanced by using a venturi injector which generates a vacuum in the flow line between the ozone generator and the venturi for the contact and storage vessels. Optionally, entrainment can further be enhanced by restricting the flow to both the storage and contact tanks, thus causing back pressure in the line carrying water. This back pressure of between 10 to 30 psi. greatly increase the dissolution rate. The venturi injector acts as a mixer when handling ozone/air mixture. STATIC MIXERS, that is, nozzles for mixing fluid materials, may or may not be placed after the venturi for additional turbulence. Ozone contact extenders can be added to increase ozone contact time with the water, which also increases the dissolution rate. These extenders may or may not be fitted with STATIC MIXERS to enhance entrainment. Furthermore, increased output of the oxygen and/or dried air ozone generator can reduce or eliminate the need for an ozone contact extender in locations where maximum dissolution is not as critical as space conservation, thus allowing for a reduction in the footprint associated with contact extenders and associated plumbing. The ozone generator may be equipped with an optional voltage regulator so that ozone levels may be increased or decreased according to need. Specifically, this regulation is applied daily in the initial start-up phase of the system or when ozone demand in the system increases due to large amounts of water-borne contaminants. This would allow greater flexibility when processing clothes or water of a heterogeneous nature.

The present invention also includes the process of tiered filtration. Starting with a coarse screen or bag filter, large particles of lint and other materials are removed. This is followed by a filter or filters designed to remove still finer particles. The storage tank then can be used as a floatation chamber, wherein sufficient back-pressure is applied to ozone gas being pumped into the tank. This will cause the creation of millions of effervescent bubbles which will float dissolved solids to the top of the storage tank where they can be removed by overflowing the tank, forcing the floated solids up and over a weir at the top of the tank. This can be followed by one or more polishing filters designed to remove even finer particles in the wash water.

Other new features include the optional use of a water softener to remove hardness from the local water supply. This feature decreases the time associated with charging the make-up water as it is added. Another feature is the optional recycling of off-gas from the top of the contact tank and entraining it into the storage tank. This reduces the total amount of ozone that needs to be generated and reduces the amount of ozone that needs to be vented and/or destroyed.

Among the objects of the present invention are the provision of an improved laundry waste water treatment system using ozone for cleaning and decontamination of laundry materials, which saves water, reduces or eliminates the need for hot water, soap and chemicals, and greatly reduces the cost of operation.

Another object is the provision of an improved laundry treatment system which utilizes a neutral to slightly basic pH, which favors hydroxyl radical (OH•) production to promote advanced oxidation chemistry in combination with ozone to enhance the cleaning process.

A still further object of the present invention is the provision of a laundry wash system using generated ozone entrained in the wash water having an improved ozone entrainment system to increase the efficiency of the ozone wash process.

A still further object of the present invention is the provision of a laundry wash system using oxygen and/or dried air generated ozone entrained in the wash water having an increased ozone production to increase the efficiency of the ozone wash process, cleaning the contaminated water, reducing the overall size, and increasing reliability.

A still further object of the present invention is the provision of a laundry wash system using contact extenders, where desirable, to increase contact time between the ozone and the wash water resulting in an increase in the ozone dissolution rate and the maximum ozone concentration that can be maintained.

A still further object of the present invention is the provision of a laundry wash system using contact extenders fitted with static mixers, where desirable, to increase the mixing between the ozone and the wash water having an increase in the ozone dissolution rate and the maximum ozone concentration that can be maintained.

A still further object of the present invention is the provision of a laundry wash system using flow restriction to create back-pressure in the effluent side of the venturi plumbing thus causing a percentage of the ozone gas to become dissolved in the process water, thus increasing the ozone dissolution rate and the maximum ozone concentration that can be maintained.

A still further object of the present invention is the provision of a laundry wash system using flow restriction to create back-pressure causing a percentage of the ozone gas to become dissolved in the storage water which can be used to float waste materials to the top of the storage means where upon an overflow of water can carry said waste material to drain. A still further object of the present invention is the provision of a laundry wash system using a tiered filtration system where in a coarse filter is applied first to remove lint and other large debris, followed subsequently by increasingly finer filtration, including floatation of dissolved and suspended solids, before water is recycled and used again.

A still further object of the present invention is the provision of a laundry wash system which recycles, where desirable, the off-gas of the contact means for use in the storage means. In addition, increased back-pressure can be applied in the recycling of the ozone off-gas, which will reduce the amount of total off-gas the system will produce.

A still further object of the present invention is the provision of a laundry wash system using sloped bottom tanks to allow for complete draining of the tank and/or particle draining to remove waste materials which have settled.

A still further object of the present invention is the provision of a laundry wash system using sloped lids on the tanks to allow for an overflow cycle, wherein the water level is raised, forcing the floated particles and debris into or over a removal weir.

A still further object of the present invention is the provision of a laundry wash system using, optional, a polishing filter (able to filter the most minute particles) as to ensure the utmost water quality in the most demanding situations.

A still further object of the present invention is the provision of a laundry wash system using dissolved air floatation (DAF) technology to further clean the wash water and greatly increase the water recycling capability.

These and other objects will become apparent with reference to the following drawings and specification.

DESCRIPTION OF THE PREFERRED EMBODIMENTS

Figure 1:
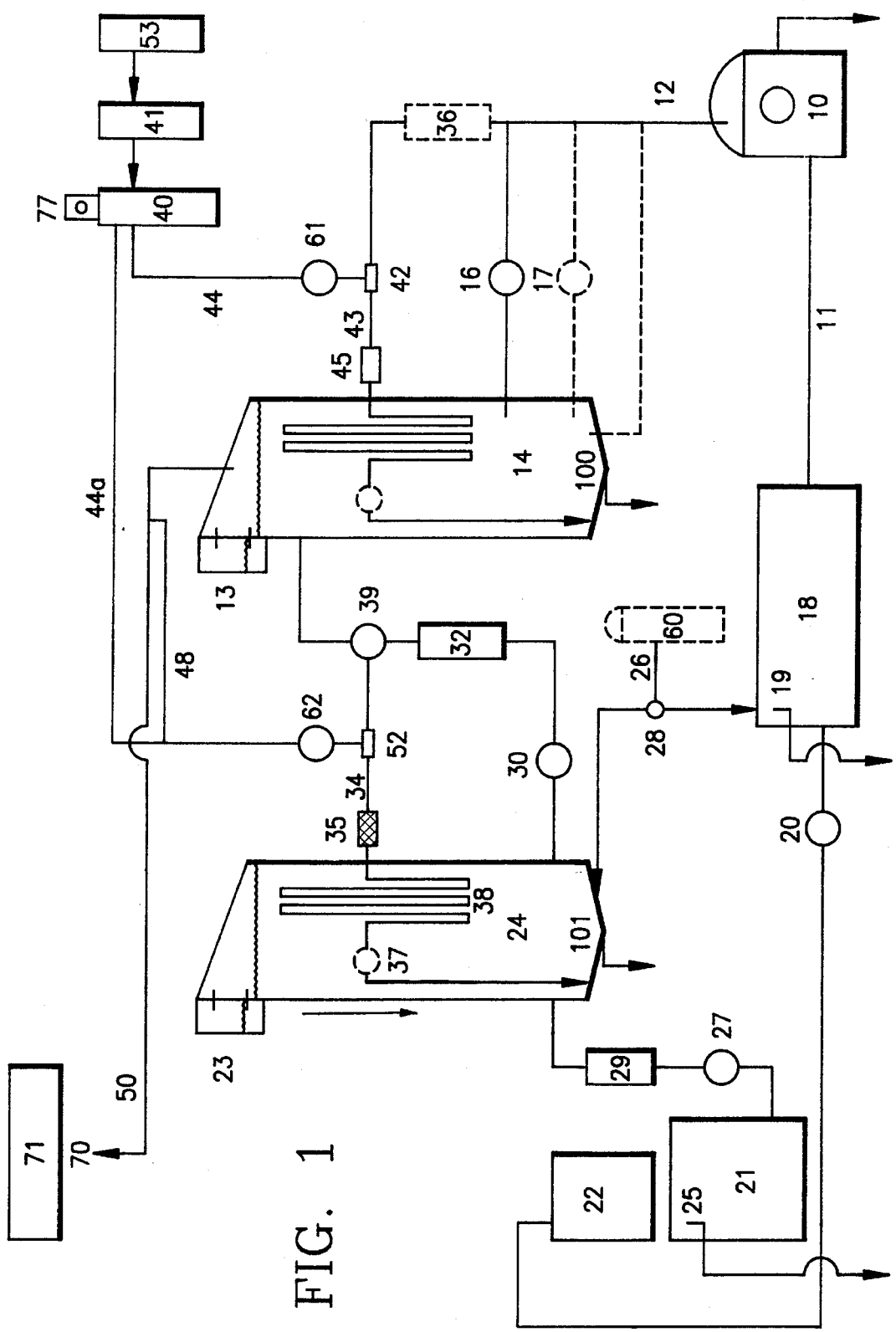
FIG. 1 illustrates a closed-loop laundry waste water treatment and wash system in accordance with the present invention, which is used when waste loading is low and water reclamation is a priority.

Referring to FIG. 1, the laundry waste water treatment and wash process and system includes one or a plurality of washing machines 10 of the type found in a commercial laundry institution, laundromat, hotel, school, dormitory, or other similar establishment where a great deal of laundry is washed. Each machine is capable of being operated independently of the other, and is supplied with ozonated wash water by a water supply line 12 connected to a water holding or contact tank 14. The wash water is fed from the contact tank 14 into the machines through a water supply line 12 by means of a supply pump 16. The wash water in contact tank 14 is already combined with the ozone to maximize cleaning without the use of, or a reduced amount of, hot water and soaps, detergents, or other chemical products to enhance the cleaning of the laundry. An optional process pump 17 may be added to increase the delivery rate of wash water to washing machine(s) 10. Wash water is pumped into the machines 10 using a process pump 16 upon activation of the machine. Washing machines 10 are drained through a drain line 11 into a sump 18, which collects the waste water for recycling. Weir 19 overflows to drain 9 to avoid any spillage if sump 18 becomes too full. After a wash cycle is completed, the spent wash water in sump 18 is pumped by a sump pump 20 through a suitable bag or screen filter 22 into a holding tank 21. Holding tank 21 has weir 25 which overflows to drain 13 to avoid any spillage if holding tank 21 becomes too full. Water from holding tank 21 is transferred by pump 27 through particulate filter 29 into storage tank 24. A supply of fresh water may also be added from a make-up water supply line 26 to storage tank 24 or sump 18 by means of a make-up water valve 28. An optional water softener 60 may be added if the indigenous water supply is subject to hardness. The water softener removes ions (Fe, Mn, Mg, Ca) that interfere with the generation of ozone, as they will oxidize and use up some of ozone in the system making it difficult to maintain an active residual level of ozone.

Pump 30 draws water from storage tank 24 and pumps it through particulate or polish filter 32. The filters in the system starting with filter 22 function as a tiered filtration system, that is the size of particulate material filtered out of the recycled water gradually becomes smaller. This prevents the initial filter 22 from becoming clogged as it does not try to collect all particulate. The water then passes secondary injector 52, drawing ozone from ozone gas line 44. The secondary injector 52 can be connected to off-gas line 50 via line 48, drawing off-gas from the top of contact tank 14 instead of drawing directly for the ozone generator 40. The gas/water mixture exiting secondary injector 52 is then passed through line 34 into a STATIC MIXER 35 and contact extender 38. The STATIC MIXER 35 may be located as shown or in tank 24 after contact extender 38 and the mixers chum the water/gas mixture to enhance dissolution. The mixer is in the form of a non-moving set of vanes or baffles. Secondary injector 52 is fitted with check valve 62 to prevent a back-flow of water to the ozone generator 40. The contact extender 38 as shown is in tank 24, however it could be positioned outside the tank. The contact extender 38 is formed from four inch diameter PVC pipe so as to form a torturous path which goes up and down before emptying in to tank 24. Where as the contact time, the time when the ozone is entrained to the time it exits the water column, is normally 5 to 15 seconds depending on the height of the tank, extender 38 functions to raise the contact time upwards of 60 seconds or more. The longer the gas bubble spends in the water column, the more of the ozone will transfer across the phase boundary, gas to liquid. The novel use of extenders thereby translates into either higher residual ozone levels or faster charge times. The contact extender 38 or STATIC MIXER 35 can be fitted with an optional flow restriction valve or fitting 37 to restrict flow and create back-pressure. Back pressure in the length of pipe from the restriction back to the pump cause increased pressure which forces the gas containing the ozone into solution, thus again creating higher residuals and faster charge times. Additional when the pressure is released, millions of effervescent bubbles are formed which carry any suspended solids to the top of the tank to be skimmed off. The water level in storage tank 24 can be raised as to overflow floated waste materials into over flow weir 23. Drain 101 is used to empty the storage tank if necessary. As called for, water from storage tank 24 is fed by a transfer pump 30 through a polish filter 32. A flow control value 39 directs the water flow from storage tank 24 into contact tank 14. The use of valve 39 is so that one pump can perform two functions. Since the transfer pump used to move water from storage tank 24 to contact tank 14 is used only part of the time, the recirculation pump 30 can be control via a valve to also direct flow back into storage tank 24 if the washing machines 10 do not demand more water. Storage tank 24 and its recirculation loop save cost as the electrical draw of the system can be reduced as water entrained with ozone is created and filtered before it reaches contact tank 14.

Water is pumped from contact tank 14 by pump 16 through primary injector 42 into line 43 and back into contact tank 14 while traveling through a STATIC MIXER 45, contact extender 46 and optional flow restricter 47. Primary injector 42 is fitted with check valve 61 to prevent a back-flow of water to the ozone generator. An optional filter 36 may be added to further polish the water. The water level in contact tank 14 can be raised as to overflow floated waste materials into over flow weir 13. In operation the water pumped by pump 16 travels a race track until it is short circuited when the washing machines 10 call for water. The valve on the washing machine opens and the pressure in the race track forces water into the machine rather than through the venturi injector 42. Optional pump 17 is used if the washing machines call for water to often thus not allowing for enough ozonation time.

When making ozone, the more concentrated the oxygen, the more ozone can be produced. Ozone is generated in the ozone generators 40 by passing oxygen concentrated in oxygen concentrator 41, though a corona discharge field. The pressure swing absorbance oxygen concentrator 41 is supplied with pressurized air from compressor 53. The oxygen concentrator can produce gas having between 50 to almost 100 percent oxygen, however, the preferred concentration is between 80–95%. The ozone generators 40 are commercial type corona discharge units. The ozone generating unit includes a voltage regulator which allows for ozone production to be regulated. If the flow is constant and the voltage is increased then ozone production is also increased. An ozone generator 40 creates ozone to be combined into the water in contact tank 14 and storage tank 24. As the processed air, containing 50 to 100 percent dried oxygen with the remaining being dried ambient air is passed over a source of high voltage electric discharge, preferably by passing through a corona discharge generator, part of the gas is transformed into charged oxygen ions which recombine to form $O_3$, or ozone. A voltage regulator 77 or 177 can be used to also vary the amount of ozone produced. If the flow rate is constant and the voltage is increased the amount of ozone produced will be increased. Ozone is removed from the ozone generators 40 and entrained into the water by means of injectors 42, which are preferably venturi injectors which draw a vacuum in the ozone feed lines 44 and 44a. The ozone is fed through an ozone injection line 43 into contact tank 14. The ozone is mixed into the wash water in contact tank 14. The gas/water mixture can then be passed through line 43 into a mixer 45, a contact extender 46 and optional a flow restriction valve or fitting 47 to restrict flow and create back-pressure. The operation of STATIC MIXER 45, contact extender 46 and fitting 47 is the same as STATIC MIXER 35, contact extender 36 and fitting 37, which was set forth above. Drain 100 is used to empty the contact tank 14 if necessary.

Contact tank 14 and storage tank 24 vent excess ozone though off-gas line 50. Off-gas is channeled to vent 70 or to an optional ozone destruct unit 71.

Figure 2:
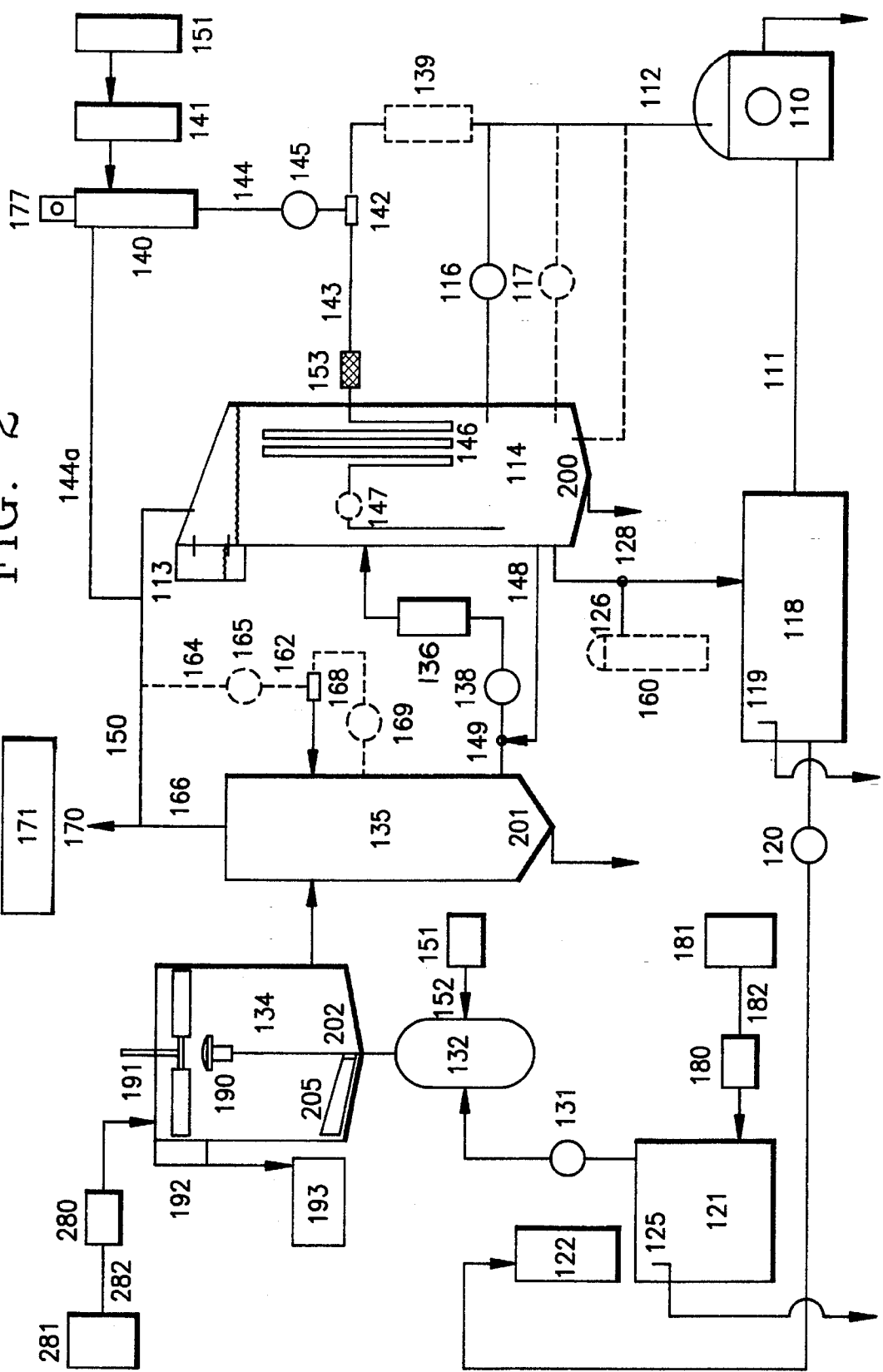
FIG. 2 illustrates a closed-loop laundry waste water treatment and wash system in accordance with the present invention, which is used when waste loading is high and water reclamation is a high priority.

Referring to FIG. 2, the laundry waste water treatment and wash process and system includes one or a plurality of washing machines 110 of the type found in a commercial laundry institution, laundromat, hotel, school, dormitory, or other similar establishment where a great deal of laundry is washed. Each machine is capable of being operated independently of the other, and is supplied with ozonated wash water by a water supply line 112 connected to a water holding or contact tank 114. The wash water is fed from the contact tank 114 into the machines through a water supply line 112 by means of a supply pump 116. The wash water in the holding tank 114 is already combined with the ozone to maximize cleaning without the use of hot water and soaps, detergents, or other chemical products to enhance the cleaning of the laundry. An optional process pump 117 may be added to increase to delivery rate of wash water to washer(s) 110. Wash water is pumped into the machines 110 using a process pump 116 upon activation of the machine. Washing machines 110 are drained through a drain line 111 into a sump 118, which collects the waste water for recycling. Weir 119 overflows to drain to avoid any spillage if sump 118 becomes too full. After a wash cycle is completed, the spent wash water in sump 118 is pumped by a sump pump 120 through a suitable bag or screen filter 122 used to remove coarse materials, like lint, buttons, etc. and then into a holding tank 121. Holding tank 121 has weir 125 which overflows to a drain to avoid any spillage if holding tank 121 becomes too full. At this point coagulation aides or polymers which stick to suspended materials may be added from reservoir 181 in order to float the dirt to the surface so as to be skimmed off. Polymers are pumped by means of polymer pump 180 through delivery line 182. Water from holding tank 121 is transferred by pump 131 to a high pressure storage tank 132. The high pressure storage tank 132 is pressurized to 45–80 psi using a compressed air supply from a compressor 151 connected to a compressed air supply line 152.

A dissolved air floatation (DAF) or solids removal tank 134 is kept at 0 psi. The high pressure tank 132 discharges into the DAF 134 through a flow distribution unit 190 which creates millions of effervescent bubbles which float suspended dirt to the top in order to be skimmed off. A second mix of polymers may be added to the DAF 134 from polymer storage tank 281 by polymer pump 280 through feed line 282 to increase the amount of flocculation and coagulation. The flow distribution unit 190 channels water horizontal allowing the millions of flotation bubbles to float the particulate matter and solid residue to the top of the DAF 134. The solid waste is removed from the top of the DAF 134 by skimmer 191 and is skimmed over weir 192 to a sludge collection tank 193. A second skimmer 205 is located at the bottom of the DAF 134, this allows for removal of settled material through drain 202. The relatively clear water from the bottom of the solids removal tank 134 is flowed into drop box 135, instead of storage tank as in the first embodiment.

The water from the drop box 135 is then transferred to contact tank 114 using transfer pump 138. The water passing from the drop box 135 to contact tank 114 is filtered through filtration unit 136 to remove the last of the finer residual particles so that the water in the contact tank is essentially dirt and residue free. Once transfer from drop box 135 has filled contact tank 114, flow control value 149 closes to establish a recycle loop using water feed line 148. This allows for continuous filtration of contact tank 114 through filter 136. Drain 201 is used to drain the tank when necessary.

An optional ozone recirculation loop may be added to drop box 135 if the pre-ozonation of the water is necessary before transfer to contact 114. Water is recirculated by pump 169 through line 168. Venturi injector 162 draw ozone gas through line 164 which is connected to ozone vent line 150. Injector 162 is fitted with a check valve 165 to prevent the back-flow of water to the ozone generator 140. The off-gas from drop box 135 is vented through vent line 166.

Fresh water is added from a make-up water supply line 126 to contact tank 114 or sump 118 by means of a make-up water valve 128. An optional water softener 160 may be added if the indigenous water supply is subject to hardness.

A feedback line 143 forms a water feedback loop which continuously circulates water back into contact tank 114 and mixes it with the water in the tank using mixer 153, contact extender 146 and optional flow restriction fitting 147. An filter 139 may be added to further polish the water in contact tank 114. The water level in contact tank 114 can be raised as to overflow floated waste materials into over flow weir 113. Drain 200 is used to empty the contact if necessary.

Ozone is generated in the ozone generators 140 in the same manner as discussed above. Ozone is removed from the ozone generators 140 and is entrained into the water by means of injectors 142, which are preferably venturi injectors which draw a vacuum in the ozone feed lines 144 and 144a. Injector 142 is fitted with a check valve 145 to prevent the back-flow of water to the ozone generator. The ozone ($O_3$) is fed through an ozone injection line 143 into contact tank 114. The ozone is entrained with the wash water in injector 142. Contact tank 114 vent excess ozone though off-gas line 150. Off-gas is channeled to vent 170 or to an optional ozone destruct unit 171.

Figure 3:
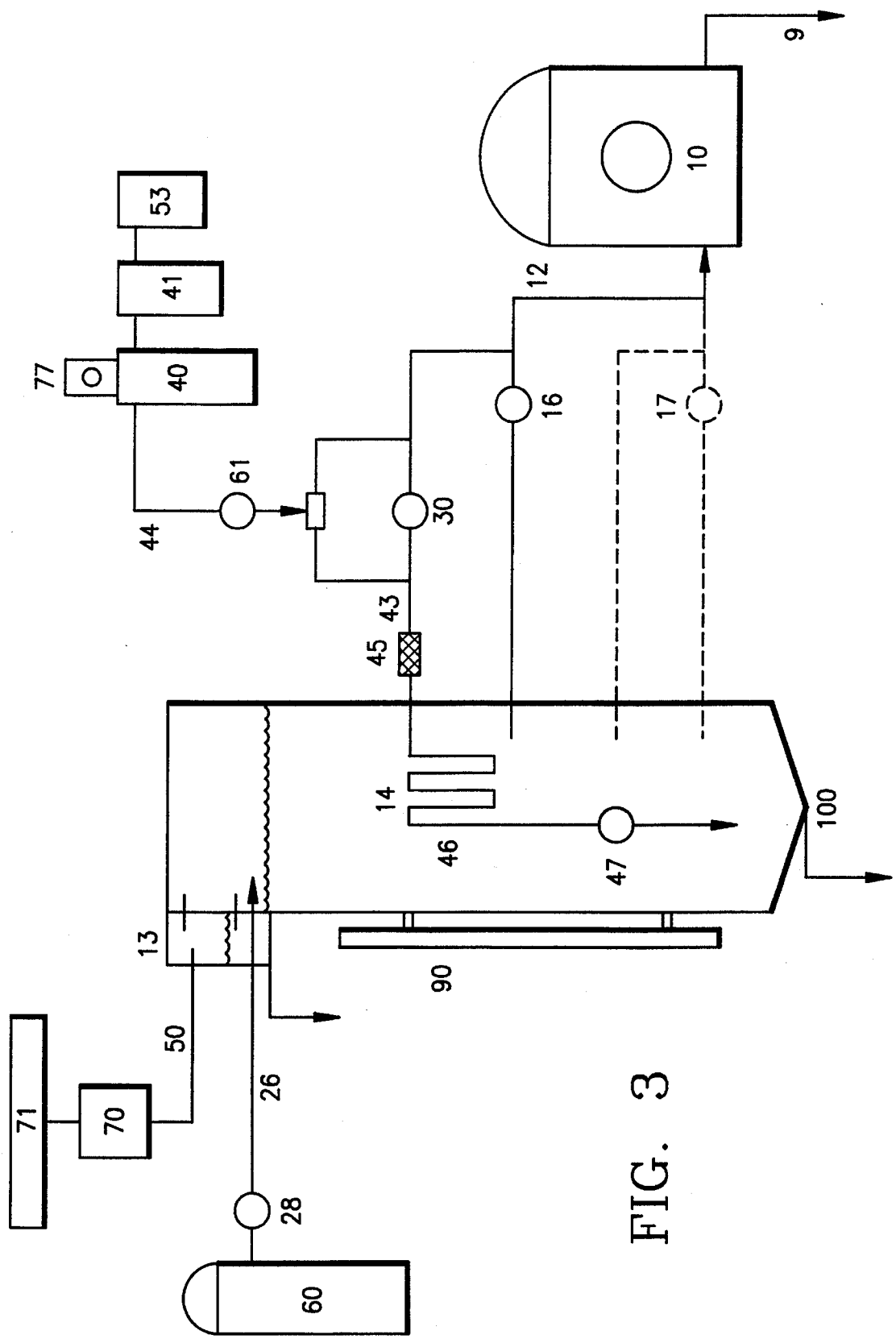
FIG. 3 illustrates a flow-through laundry wash system in accordance with the present invention.

Referring to FIG. 3, the system is similar to that shown in FIG. 1 except the recycling components have been removed. This system does show the use of float 90 for controlling when fresh water is to be added to the system.

In use, a continuous closed fluid flow loop is provided using institutional or commercial laundry washing machines 10, 110 or the like. It will be appreciated that the disclosed system is not necessarily limited to these types of heavy-duty laundry systems, but could be adapted equally well for home use by using smaller components and fluid flow apparatus. Each machine would normally be capable of washing up to a 125 pound load, though the system can service washers of even the smallest commercial size of 35 lb. up to the largest 600 to 800 lb. units. With slight modifications to the flow schematics, with no appreciable change in the machine design, the unit can be made to service continuous flow tunnel washers.

In summary, the system of the present invention provides a closed loop recycled wash water system using ozone to wash clothes with a reduced requirement for or without using hot water or chemicals such as soaps or detergents. The system further includes a venturi injector to enhance entrainment of the ozone into the wash water used in the washing machines.

It will be appreciated that modifications may be made in the system and apparatus described herein above in keeping within the scope of the present invention, as defined in the following claims.

We claim:

1. A method of washing laundry using a closed-loop wash water system comprising the steps of:

maintaining a supply of wash water in a contact tank;

supplying a gas of oxygen or dried air from a oxygen concentrator to an ozone generator, which is part of a total ozone generation process, treating this gas with a source of electric discharge and generating ozone thereby, wherein the oxygen percentage of oxygen fed into the ozone generator is controlled by the oxygen concentrator and the ozone production is controlled by the use of a voltage regulator;

mixing the ozone into said wash water supply;

delivering said ozonated wash water supply to a washing means upon commencement of a wash cycle;

washing said laundry in said washing means; collecting said wash water supply in a collecting means at the end of the wash cycle; and, recirculating said wash water supply from said collecting means to said contact tank.

2. A method as set forth in claim 1 including the steps of removal of solids from said wash water supply in a solids removal tank or DAF at the end of the wash cycle and, recirculating said wash water supply from said DAF to said contact tank.

3. The method of claim 1 further including the step of creating a vacuum in a supply line between said ozone generator and said contact tank means to accelerate entrainment of the ozone in the wash water supply.

4. The method of claim 1 including the step of increasing the contact time by adding contact extenders to aid in mixing the ozone gas and increase dissolution rate.

5. The method of claim 1 including the further step of using a flow restriction fitting to create back pressure.

6. A method of washing laundry using a flow through wash water system comprising the steps of:

maintaining a supply of wash water in a contact tank;

supplying a gas of oxygen and/or dried air from an oxygen concentrator to an ozone generator, wherein the oxygen percentage of oxygen fed into the ozone generator is controlled by the oxygen concentrator, treating the oxygen and/or dried air gas with a source of electric discharge and generating ozone, wherein the ozone production is controlled by the use of a voltage regulator, and mixing the ozone into said wash water supply;

delivering said ozonated wash water supply to a washing means upon commencement of a wash cycle;

washing said laundry in said washing means;

draining said wash water supply at the end of the wash cycle.

7. The method of claim 6 further including the step of creating a vacuum in a supply line between said ozone generator and said contact tank means to accelerate entrainment of the ozone in the wash water supply.

8. The method of claim 6 including the step of increasing the contact time by adding contact extenders to aid in mixing the ozone gas and increase dissolution rate.

9. The method of claim 6 including the further step of using a flow restriction fitting to create back pressure.

* * * * *